(12) United States Patent
Dayal et al.

(10) Patent No.: US 8,903,412 B2
(45) Date of Patent: *Dec. 2, 2014

(54) DATA TRANSMISSION AND POWER CONTROL IN A MULTIHOP RELAY COMMUNICATION SYSTEM

(71) Applicant: QUALCOMM Incorporated, San Diego, CA (US)

(72) Inventors: Pranav Dayal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,913

(22) Filed: Mar. 9, 2013

(65) Prior Publication Data

US 2013/0188507 A1 Jul. 25, 2013

Related U.S. Application Data

(63) Continuation of application No. 12/042,901, filed on Mar. 5, 2008, now Pat. No. 8,417,255.

(60) Provisional application No. 60/895,388, filed on Mar. 16, 2007.

(51) Int. Cl.
*H04W 72/00* (2009.01)
*H04W 4/00* (2009.01)
*H04W 72/04* (2009.01)
*H04L 1/00* (2006.01)

(52) U.S. Cl.
CPC ....... *H04W 72/04* (2013.01); *H04L 2001/0092* (2013.01); *H04L 1/0025* (2013.01); *H04L 1/0026* (2013.01)
USPC ....................................... 455/452.2; 455/466

(58) Field of Classification Search
CPC .......... H04W 72/1231; H04W 72/085; H04W 28/04; H04W 72/1284; H04L 1/0026; H04L 1/0003; H04L 1/0009; H04L 1/20
See application file for complete search history.

(56) References Cited

U.S. PATENT DOCUMENTS 8,417,255 B2 4/2013 Dayal et al.
2005/0068884 A1* 3/2005 Yoon et al. .................... 370/203
(Continued)

FOREIGN PATENT DOCUMENTS

EP 1241837 9/2002
EP 1388964 A1 2/2004
(Continued)

OTHER PUBLICATIONS

Energy Efficient Channel Quality Indication (CQI) Feedback Scheme for UMTS High-speed Downlink Packet access; Soo-Young et al; 2005; pp. 246 and 247.*

(Continued)

*Primary Examiner* — Michael Faragalla
(74) *Attorney, Agent, or Firm* — Tyler J. Overall

(57) ABSTRACT

Techniques for transmitting data with distributed and centralized scheduling in a multihop relay communication system are described. For distributed scheduling, a relay station may generate and send first channel quality information (CQI) to a base station and receive second CQI from a subscriber station. The relay station may receive data sent by the base station based on the first CQI and may resend the data to the subscriber station based on the second CQI. For centralized scheduling, the relay station may generate first CQI for the base station, receive second CQI from the subscriber station, and send both CQIs to the base station. The relay station may receive data sent by the base station based on the first CQI and may resend the data to the subscriber station based on a scheduling decision determined based on the second CQI. Techniques for distributed and centralized power control are also described.

30 Claims, 14 Drawing Sheets

(56) References Cited

U.S. PATENT DOCUMENTS

| | | |
|---|---|---|
| 2007/0066240 A1 | 3/2007 | Hart |
| 2009/0111384 A1 | 4/2009 | Yoshii et al. |
| 2009/0227201 A1 | 9/2009 | Imai et al. |

FOREIGN PATENT DOCUMENTS

| | | | |
|---|---|---|---|
| EP | 1463230 A2 | 9/2004 | |
| EP | 1631010 | 3/2006 | |
| JP | 2005142676 A | 6/2005 | |
| JP | 2006352887 A | 12/2006 | |
| JP | 2006352890 A | 12/2006 | |
| KR | 20060099454 A | 9/2006 | |
| WO | 2004064424 | 7/2004 | |
| WO | 2005060132 | 6/2005 | |
| WO | 2006098273 A1 | 9/2006 | |
| WO | 2006099024 A2 | 9/2006 | |
| WO | WO 2006/099024 * | 9/2006 | ............ G06F 13/00 |
| WO | 2007020958 A1 | 2/2007 | |

OTHER PUBLICATIONS

Dong-Ho Cho, et al., "Energy-efficient channel quality indication (CQI) feedback scheme for UMTS high-speed downlink packet access", IEEE 62nd Vehicular Technology Conference, 2005. VTC-2005-Fall., U.S.A., IEEE, Sep. 25, 2005, vol. 1, pp. 245-249.

International Search Report—PCT/US2008/057122, International Search Authority—European Patent Office—Aug. 1, 2008.

Kolding, T.E., et al., "Low-Bandwidth Channel Quality Indication for OFDMA Frequency Domain Packet Scheduling ", 3rd International Symposium on Wireless Communication Systems, 2006. ISWCS '06., U.S.A., IEEE, Sep. 6, 2006, pp. 282-286.

Taiwan Search Report—TW097109413—TIPO—Mar. 28, 2012.

Written Opinion—PCT/US2008/057122, International Search Authority—European Patent Office—Aug. 1, 2008.

Yanling Lu, et ., "Distributed Scheduling in 802.16j system", IEEE 802.16 Broadband Wireless Access Working Group contribution, U.S.A., IEEE, Jan. 8, 2007, pp. 0-8, http://www.ieee802.org/16/relay/contrib/C80216j-07_078.pdf.

Yong Su Lee, et al., "Access-Uplink closed loop power control by MMR-BS or RS in MMR system", IEEE 802.16 Broadband Wireless Access Working Group Contribution, U.S.A., IEEE, Nov. 7, 2006, IEEE C802.16j-06/244, whole document.

Zheng, et al, "Relay Support for Distributed Scheduling and its Bandwidth Request/AllocationMechanism", IEEE 802.16 Broadband Wireless Access Working Group Contribution, U.S.A., IEEE, Jan. 15, 2007, IEEE C802.16j-07/034r1, whole pages, http://www.ieee802.org/16/relay/contrib/C80216j-07_034r1.pdf.

\* cited by examiner

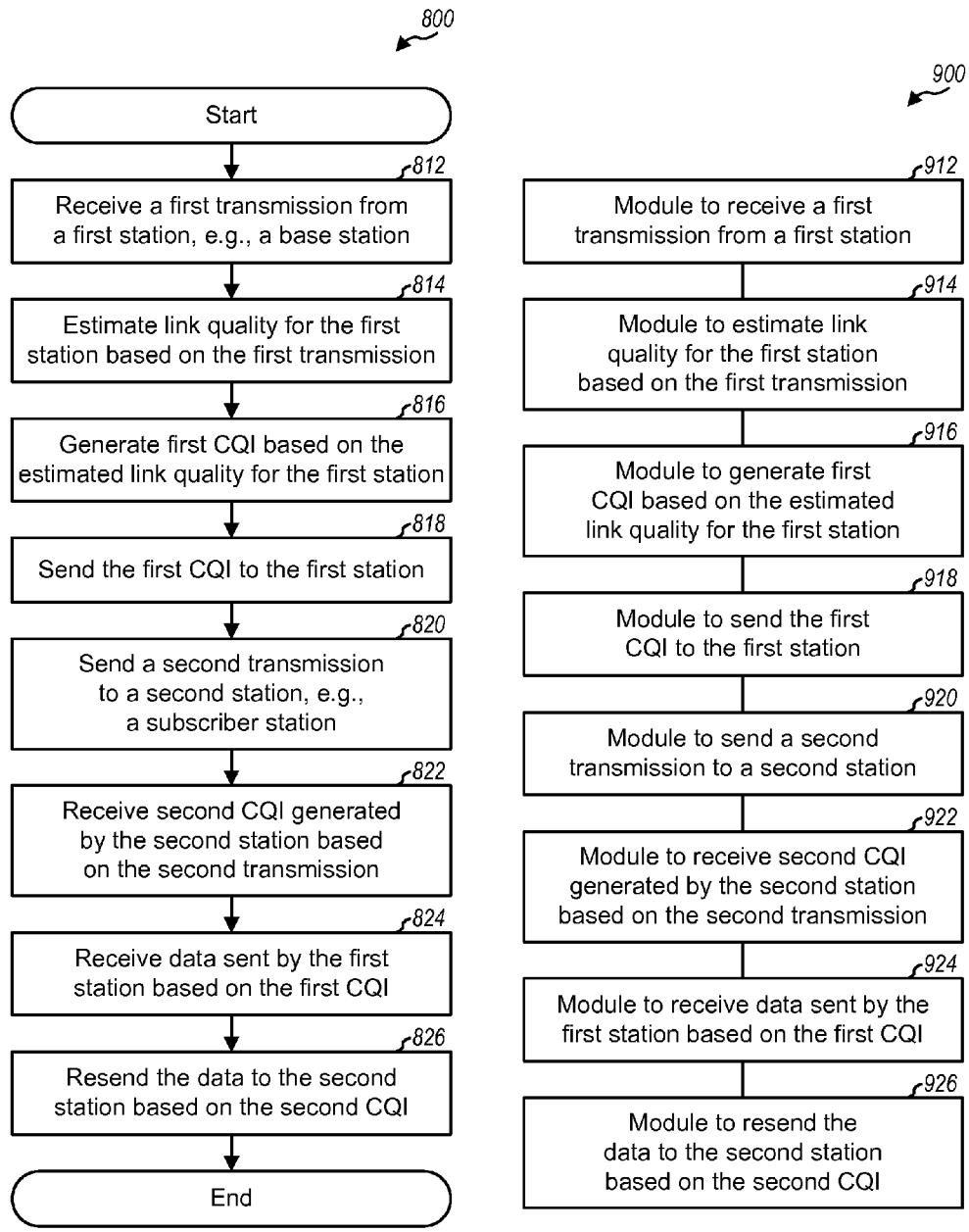

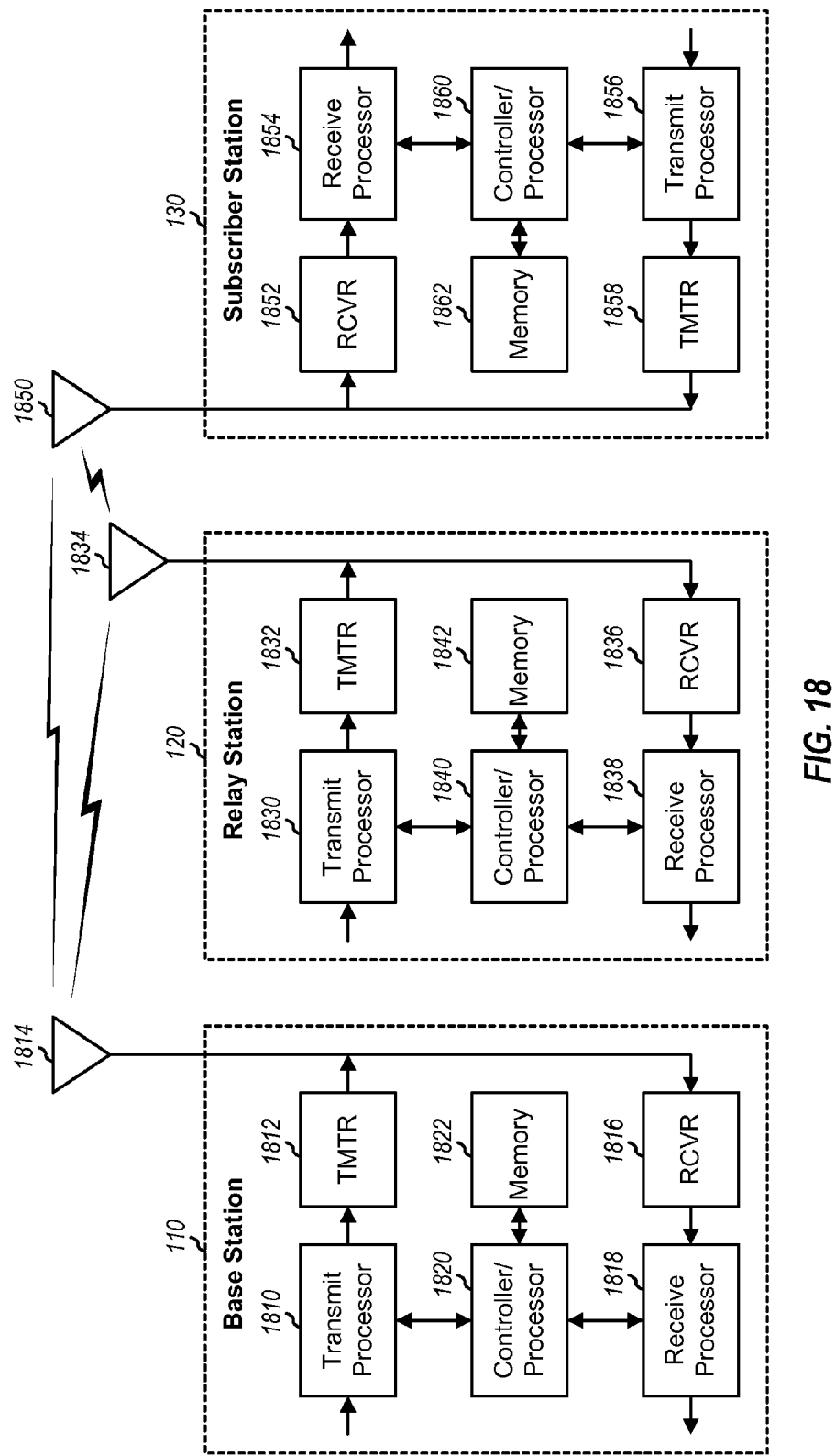

DATA TRANSMISSION AND POWER CONTROL IN A MULTIHOP RELAY COMMUNICATION SYSTEM

The present Application for Patent is a continuation of U.S. patent application Ser. No. 12/042,901 to Dayal et. al. entitled "DATA TRANSMISSION AND POWER CONTROL IN A MULTIHOP RELAY COMMUNICATION SYSTEM" filed Mar. 5, 2008; which claims priority to U.S. Provisional Patent Application No. 60/895,388 to Dayal et. al. entitled "CHANNEL INFORMATION MEASUREMENT AND REPORTING IN A WIRELESS MULTIHOP RELAY SYSTEM" filed Mar. 16, 2007; both of which are assigned to the assignee hereof and hereby expressly incorporated by reference herein.

BACKGROUND

I. Field

The present disclosure relates generally to communication, and more specifically to techniques for transmitting data in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. Wireless systems have established themselves as a growing area in the field of telecommunications. The current trends and demands are to deliver multimedia services such as voice, video, interactive games, etc., with guaranteed Quality of Service (QoS). High data transmission capability is desirable in order to support high quality multimedia services.

A wireless communication system may support multihop relay in order to improve coverage and/or performance. With multihop relay, a base station may transmit data to a subscriber station via one or more relay stations. Each relay station may receive data from an upstream station (e.g., the base station or another relay station) and may retransmit the data to a downstream station (e.g., the subscriber station or another relay station). A transmission from one station to another station is considered as a hop. It may be desirable for each relay station to retransmit the data in an efficient manner.

SUMMARY

Techniques for transmitting data and performing power control in a multihop relay communication system are described herein. In one aspect, distributed scheduling and/or centralized scheduling may be supported for data transmission. In another aspect, distributed power control and/or centralized power control may be supported on the uplink.

In one design of distributed scheduling, a relay station may receive a first pilot from a base station, estimate link quality for the base station based on the first pilot, generate first channel quality information (CQI) based on the estimated link quality, and send the first CQI to the base station. The relay station may also send a second pilot to a subscriber station and receive second CQI generated by the subscriber station based on the second pilot. The relay station may receive data sent by the base station based on the first CQI and may resend the data to the subscriber station based on the second CQI.

In one design of centralized scheduling, a relay station may receive a first pilot from a base station, estimate link quality for the base station based on the first pilot, and generate first CQI based on the estimated link quality. The relay station may send a second pilot to a subscriber station and receive second CQI generated by the subscriber station based on the second pilot. The relay station may send the first CQI and the second CQI to the base station. The relay station may receive data sent by the base station based on the first CQI. The relay station may also receive a scheduling decision determined by the base station based on the second CQI. The relay station may resend the data to the subscriber station based on the scheduling decision.

In one design of distributed power control, a relay station may receive a first transmission (e.g., on a CQI channel) from a subscriber station, estimate link quality for the subscriber station based on the first transmission, generate a first power adjustment based on the estimated link quality, and send the first power adjustment to the subscriber station. The relay station may send a second transmission (e.g., on another CQI channel) to a base station and receive a second power adjustment generated by the base station based on the second transmission. The relay station may receive data sent by the subscriber station at transmit power determined based on the first power adjustment. The relay station may resend the data to the base station at transmit power determined based on the second power adjustment.

In one design of centralized power control, a relay station may receive a first transmission from a subscriber station, estimate link quality for the subscriber station based on the first transmission, and send the estimated link quality for the subscriber station and a second transmission to a base station. The relay station may receive first and second power adjustments from the base station. The first power adjustment may be generated based on the estimated link quality for the subscriber station, and the second power adjustment may be generated based on the second transmission from the relay station. The relay station may send the first power adjustment to the subscriber station. The relay station may receive data sent by the subscriber station at transmit power determined based on the first power adjustment. The relay station may resend the data to the base station at transmit power determined based on the second power adjustment.

Various aspects and features of the disclosure are described in further detail below.

BRIEF DESCRIPTION OF THE DRAWINGS

FIG. 8 shows a process for supporting distributed scheduling.

FIG. 9 shows an apparatus supporting distributed scheduling.

FIG. 18 shows a block diagram of a base station, a relay station, and a subscriber station.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11 (which is also referred to as Wi-Fi), IEEE 802.16 (which is also referred to as WiMAX), IEEE 802.20, Flash-OFDM®, etc. These various radio technologies and standards are known in the art. The terms "radio technology", "radio access technology", and "air interface" are often used interchangeably.

For clarity, certain aspects of the techniques are described below for WiMAX, which is covered in IEEE 802.16, entitled "Part 16: Air Interface for Fixed and Mobile Broadband Wireless Access Systems," dated Oct. 1, 2004, in IEEE 802.16e, entitled "Part 16: Air Interface for Fixed and Mobile Broadband Wireless Access Systems Amendment 2: Physical and Medium Access Control Layers for Combined Fixed and Mobile Operation in Licensed Bands," dated Feb. 28, 2006, and in IEEE 802.16j, entitled "Part 16: Air Interface for Fixed and Mobile Broadband Wireless Access Systems Multihop Relay Specification," dated Dec. 24, 2007. These documents are publicly available. The techniques may also be used for IEEE 802.16m, which is a new air interface being developed for WiMAX. IEEE 802.16j covers multihop relay and is intended to enhance performance of IEEE 802.16 standards by introducing relay stations. Some objectives of IEEE 802.16j include extending coverage area, enhancing throughput and system capacity, saving battery life of subscriber stations, and minimizing complexity of relay stations.

Figure 1:
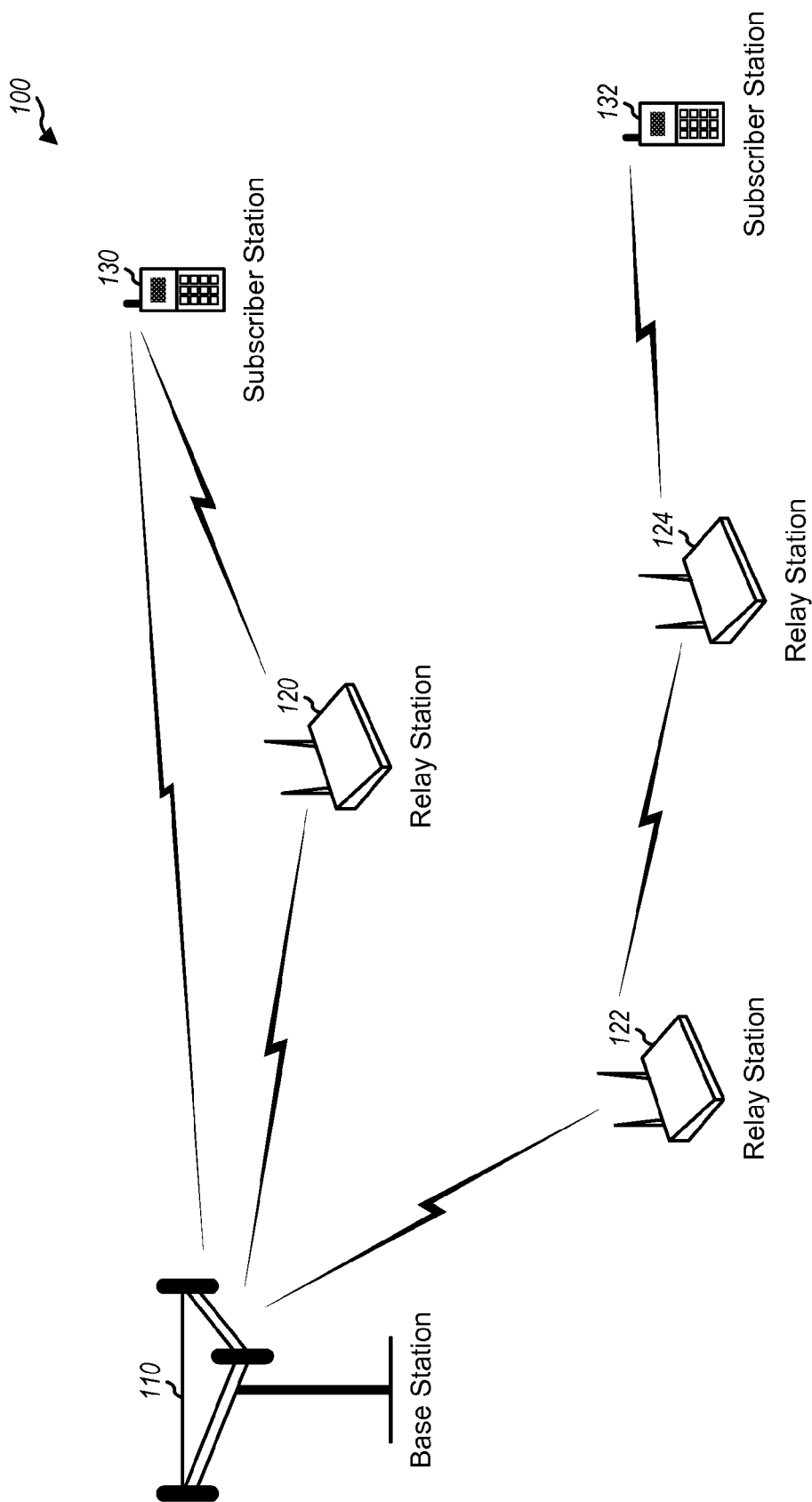
FIG. 1 shows a wireless communication system supporting multihop relay.

FIG. 1 shows a wireless communication system 100 that supports multihop relay. For simplicity, FIG. 1 shows only one base stations (BS) 110, three relay stations (RS) 120, 122 and 124, and two subscriber stations (SS) 130 and 132. In general, a system may include any number of base stations and any number of relay stations that support communication for any number of subscriber stations. A base station is a station that supports communication for subscriber stations. A base station may perform functions such as connectivity, management, and control of relay stations and subscriber stations. A base station may also be referred to as a Node B, an evolved Node B, an access point, etc. A relay station is a station that provides connectivity to other relay stations and/or subscriber stations. A relay station may also provide management and control of subordinate relay stations and/or subscriber stations. The air interface between a relay station and a subscriber station may be identical to the air interface between a base station and a subscriber station. A base station may be coupled to a core network via a backhaul (not shown in FIG. 1) in order to support various services. A relay station may or may not be directly coupled to the backhaul and may have limited functionality to support multihop communication via that relay station.

Subscriber stations may be dispersed throughout the system, and each subscriber station may be stationary or mobile. A subscriber station may also be referred to as a mobile station, a terminal, an access terminal, a user equipment, a subscriber unit, a station, etc. A subscriber station may be a cellular phone, a personal digital assistant (PDA), a wireless device, a wireless modem, a handheld device, a laptop computer, a cordless phone, etc. A subscriber station may communicate with a base station and/or a relay station via the downlink (DL) and uplink (UL). The downlink (or forward link) refers to the communication link from the base station or the relay station to the subscriber station. The uplink (or reverse link) refers to the communication link from the subscriber station to the base station or the relay station.

In the example shown in FIG. 1, base station 110 may communicate with subscriber station 130 via relay station 120. On the downlink, base station 110 may transmit data for subscriber station 130 to relay station 120, which may retransmit the data to subscriber station 130. On the uplink, subscriber station 130 may transmit data to relay station 120, which may retransmit the data to base station 110. Base station 110 and subscriber station 130 may also be able to communicate directly with one another.

Base station 110 may also communicate with subscriber station 132 via relay stations 122 and 124. On the downlink, base station 110 may transmit data for subscriber station 132 to relay station 122, which may retransmit the data to relay station 124, which may further retransmit the data to subscriber station 132. On the uplink, subscriber station 132 may transmit data to relay station 124, which may retransmit the data to relay station 122, which may further retransmit the data to base station 110. Base station 110 may not be able to communicate directly with subscriber station 132 and may rely on one or more relay stations for communication with subscriber station 132.

FIG. 1 shows an example of 2-hop communication between base station 110 and subscriber station 130. FIG. 1 also shows an example of 3-hop communication between base station 110 and subscriber station 132. In general, a base station and a subscriber station may communicate via any number of hops. In the following description, from the perspective of a given station, an upstream station is a station in an upstream path to a base station, and a downstream station is a station in a downstream path to a subscriber station.

Figure 2:
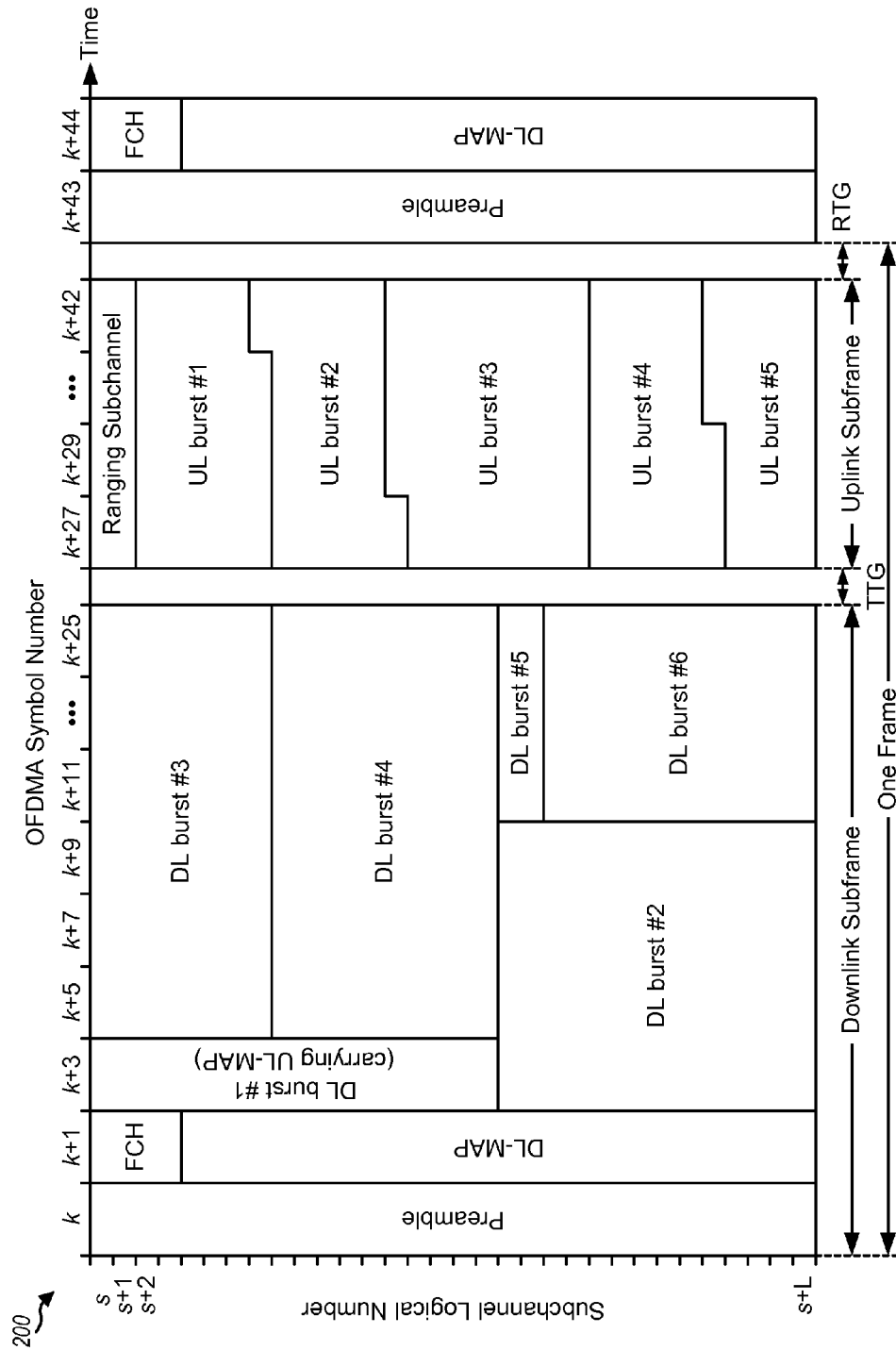
FIG. 2 shows a frame structure without multihop relay.

FIG. 2 shows an example frame structure 200 without multihop relay for a time division duplex (TDD) mode in IEEE 802.16. The transmission timeline may be partitioned into units of frames. Each frame may span a predetermined time duration, e.g., 5 milliseconds (ms), and may be partitioned into a downlink subframe and an uplink subframe. The downlink and uplink subframes may be separated by a transmit transmission gap (TTG) and a receive transmission gap (RTG).

A number of physical subchannels may be defined. Each physical subchannel may include a set of subcarriers that may be contiguous or distributed across the system bandwidth. A number of logical subchannels may also be defined and may be mapped to the physical subchannels based on a known mapping. The logical subchannels may simplify the allocation of resources.

As shown in FIG. 2, a downlink subframe may include a preamble, a frame control header (FCH), a downlink map (DL-MAP), an uplink map (UL-MAP), and downlink (DL) bursts. The preamble may carry a known transmission that may be used by subscriber stations for frame detection and synchronization. The FCH may carry parameters used to receive the DL-MAP, the UL-MAP, and the downlink bursts. The DL-MAP may carry a DL-MAP message, which may include information elements (IEs) for various types of control information (e.g., resource allocation) for downlink access. The UL-MAP may carry a UL-MAP message, which may include IEs for various types of control information for uplink access. The downlink bursts may carry data for the subscriber stations being served. An uplink subframe may include uplink bursts, which may carry data from the subscriber stations scheduled for uplink transmission.

In general, the downlink and uplink subframes may cover any fraction of a frame. In the example shown in FIG. 2, a frame includes 43 orthogonal frequency division multiplexing (OFDM) symbols, the downlink subframe includes 27 OFDM symbols, and the uplink subframe includes 16 OFDM symbols. The frame, downlink subframe, and uplink subframe may also have other durations.

As shown in FIG. 1, a base station may transmit data to a subscriber station via one or more relay stations. The system may support a transparent mode and a non-transparent mode for multihop relay. Table 1 lists some characteristics of the transparent mode and the non-transparent mode, which are described in detail in the aforementioned IEEE 802.16j document.

TABLE 1

| Mode | Description |
| --- | --- |
| Transparent mode | Base station schedules transmission on the downlink, generates assignment messages, and coordinates retransmission by relay stations. Relay station retransmits data received from the base station but does not transmit preamble, FCH or MAP. Subscriber station receives assignment messages from the base station and receives data from the relay station. |
| Non-transparent mode | Base station schedules transmission for the first hop to the relay station. Relay station can schedule retransmission for subsequent hop and generate assignment messages. Relay station retransmits data received from the base station and also transmits preamble, FCH and MAP. Subscriber station receives assignment messages and data from the relay station. |

Figure 3:
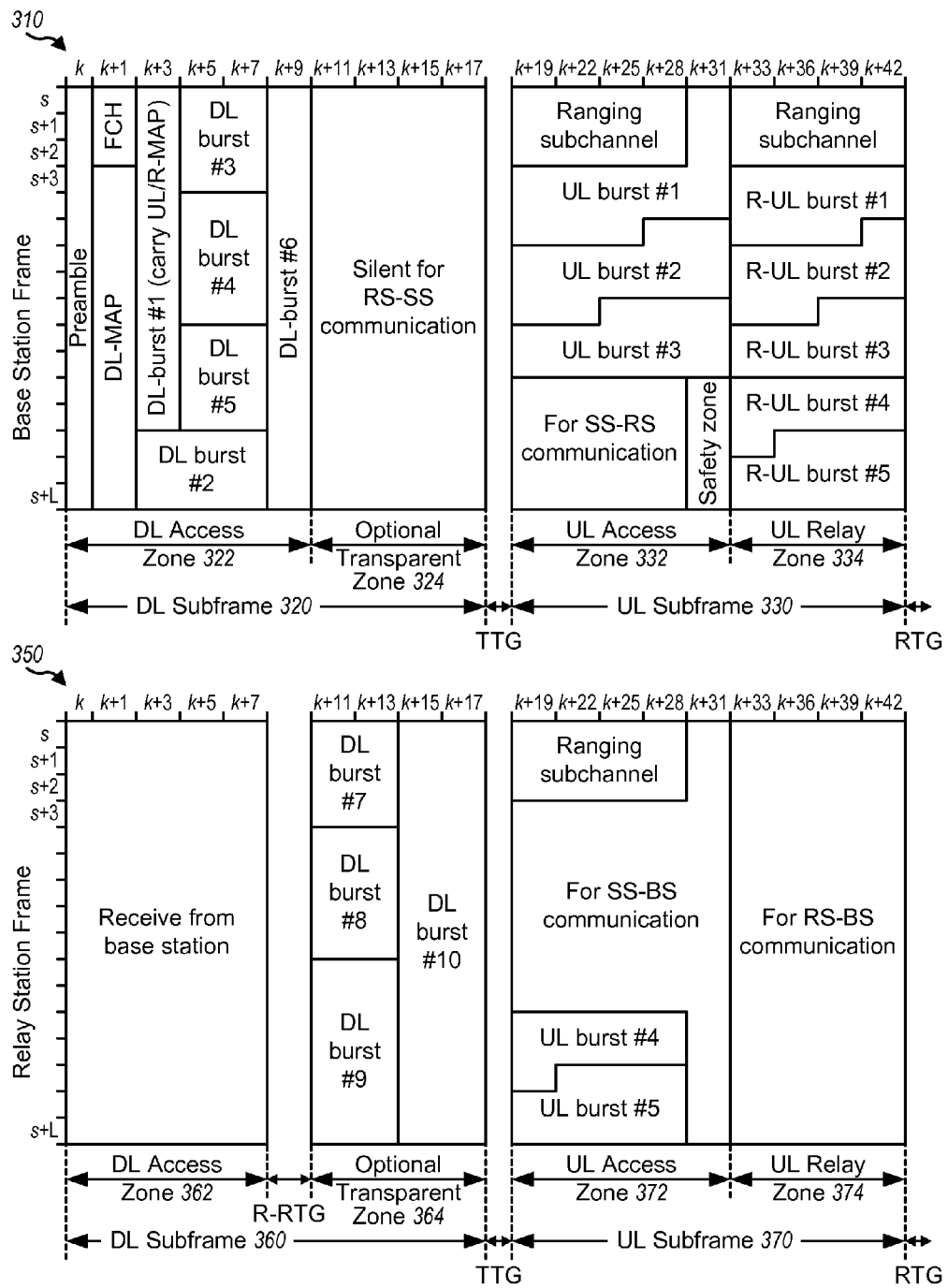
FIG. 3 shows a frame structure for multihop relay in a transparent mode.

FIG. 3 shows a frame structure for multihop relay in the transparent mode. The top half of FIG. 3 shows a frame 310 for a base station, and the bottom half of FIG. 3 shows a frame 350 for a relay station.

Frame 310 includes a downlink subframe 320 and an uplink subframe 330. Downlink subframe 320 may be partitioned into a downlink access zone 322 and an optional transparent zone 324. Each zone may include any number of OFDM symbols. The base station may transmit a preamble, an FCH, a DL-MAP, a UL-MAP, a relay MAP (R-MAP), and downlink bursts to the relay station and/or subscriber stations in downlink access zone 322. The R-MAP may carry an R-MAP message that may convey the detailed allocation for the relay station in optional transparent zone 324. The base station may or may not transmit during zone 324. Uplink subframe 330 may be partitioned into an uplink access zone 332 and an uplink relay zone 334. Uplink access zone 332 may include uplink bursts sent by subscriber stations to the base station and/or the relay station. Uplink relay zone 334 may include uplink bursts sent by the relay station to the base station.

Frame 350 includes a downlink subframe 360 and an uplink subframe 370. Downlink subframe 360 may be partitioned into a downlink access zone 362 and an optional transparent zone 364, which may be time-aligned with zones 322 and 324 of frame 310. Zones 362 and 364 are separated by a relay receive transition gap (R-RTG). The relay station may receive the preamble, FCH, DL-MAP, UL-MAP, R-MAP, and downlink bursts from the base station in downlink access zone 362. The relay station may retransmit some or all of the data received from the base station in optional transparent zone 364 as indicated by the R-MAP message. Uplink subframe 370 may be partitioned into an uplink access zone 372 and an uplink relay zone 374, which may be time-aligned with zones 332 and 334 of frame 310. Uplink access zone 372 may include uplink bursts sent by subscriber stations to the base station and/or the relay station. Uplink relay zone 374 may include uplink bursts sent by the relay station to the base station.

In the transparent mode, the base station may send a DL-MAP message that conveys the downlink burst assigned to each subscriber station being served. A subscriber station may receive the preamble, FCH, and DL-MAP message from the base station and may determine its assigned downlink burst based on the DL-MAP message. The subscriber station may then process the assigned downlink burst, which may be transmitted by either the base station or the relay station. The relay station may receive data from the base station and retransmit the data as indicated by the base station.

Figure 4:
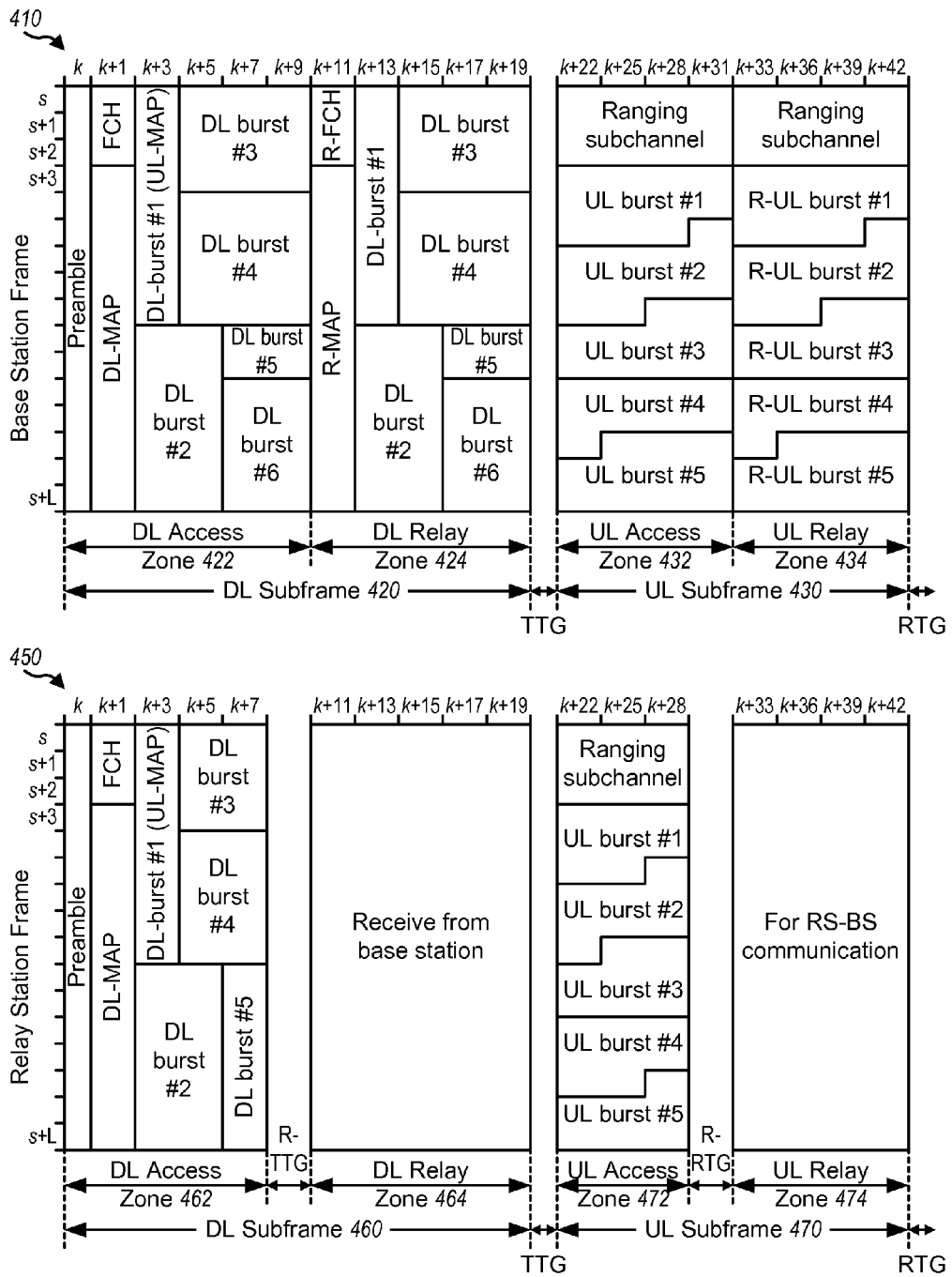
FIG. 4 shows a frame structure for multihop relay in a non-transparent mode.

FIG. 4 shows a frame structure for multihop relay in the non-transparent mode. The top half of FIG. 4 shows a frame 410 for a base station, and the bottom half of FIG. 4 shows a frame 450 for a relay station.

Frame 410 includes a downlink subframe 420 and an uplink subframe 430. Downlink subframe 420 may be partitioned into a downlink access zone 422 and a downlink relay zone 424. The base station may transmit a preamble, an FCH, a DL-MAP, a UL-MAP, and downlink bursts in downlink access zone 422 to subscriber stations. The base station may transmit a relay FCH (R-FCH), an R-MAP, and downlink bursts in downlink relay zone 424 to the relay station. Uplink subframe 430 may be partitioned into an uplink access zone 432 and an uplink relay zone 434. Uplink access zone 432 may include uplink bursts sent by subscriber stations to the base station and/or the relay station. Uplink relay zone 434 may include uplink bursts sent by the relay station to the base station.

Frame 450 includes a downlink subframe 460 and an uplink subframe 470. Downlink subframe 460 may be partitioned into a downlink access zone 462 and a downlink relay zone 464, which may be time-aligned with zones 422 and 424 of frame 410. The relay station may receive the R-FCH, R-MAP, and downlink bursts from the base station in downlink relay zone 464. The relay station may transmit a preamble, an FCH, a DL-MAP, a UL-MAP, and downlink bursts for some or all of the data received from the base station in downlink access zone 462 of the next frame. There is a delay of one frame for the data retransmitted by the relay station. Uplink subframe 470 may be partitioned into an uplink access zone 472 and an uplink relay zone 474, which may be time-aligned with zones 432 and 434 of frame 410. Uplink access zone 472 may include uplink bursts sent by subscriber stations to the base station and/or the relay station. Uplink relay zone 474 may include uplink bursts sent by the relay station to the base station.

In the non-transparent mode, the base station may send an R-MAP message that may convey the downlink bursts for each relay station in downlink relay zone 424. A relay station may receive the data from the base station as indicated by the R-MAP message. The relay station may transmit a preamble, an FCH, a DL-MAP, a UL-MAP, and downlink bursts containing the data received from the base station in downlink access zone 462 to subscriber stations. The DL-MAP message may convey the downlink burst assigned by the relay station to each subscriber station. Each subscriber station may receive the preamble, FCH, DL-MAP message, and data from the relay station and may not need to receive anything from the base station.

Figure 5:
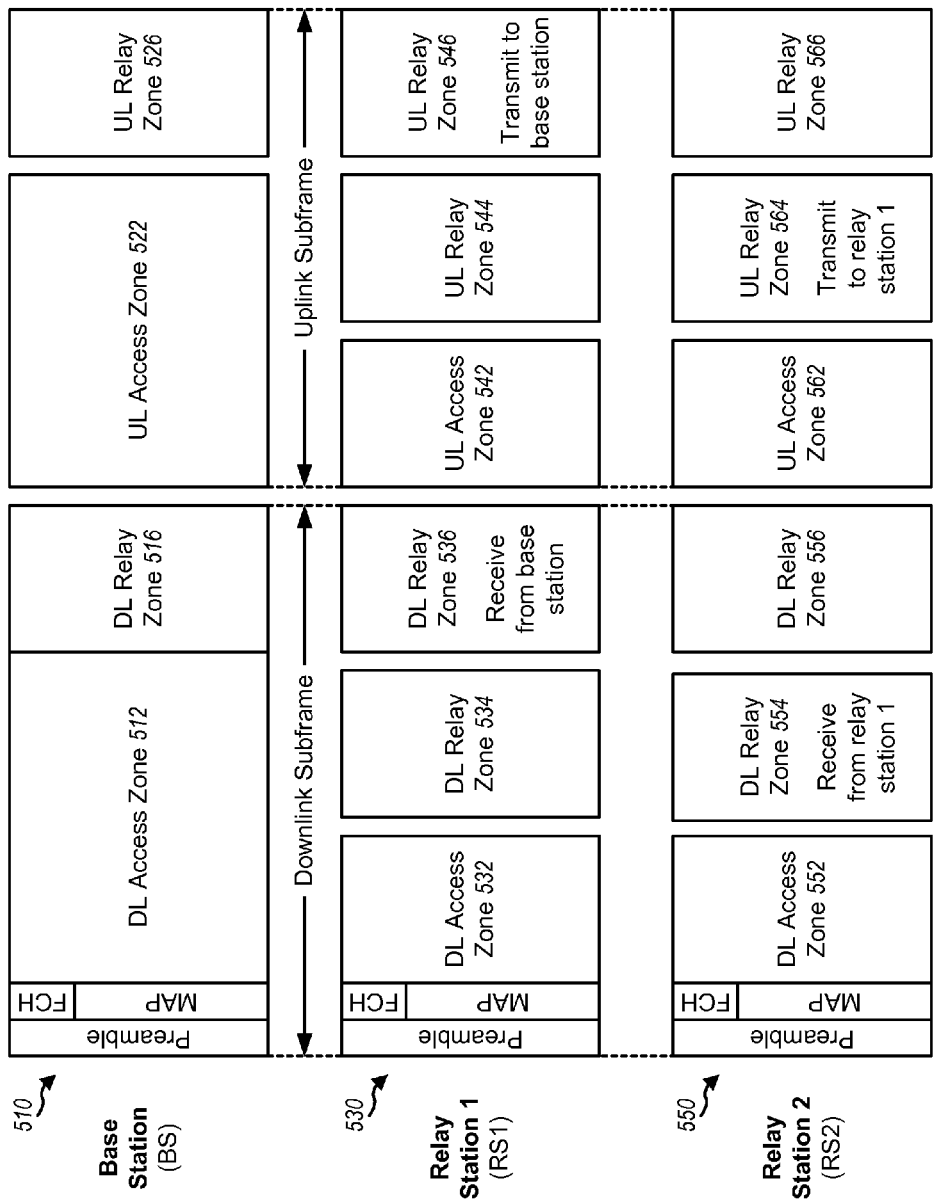
FIG. 5 shows a frame structure for three hops in the non-transparent mode.

FIG. 5 shows a frame structure for three hops in the non-transparent mode. The top of FIG. 5 shows a frame 510 for a base station, the middle of FIG. 5 shows a frame 530 for a first relay station (RS1), and the bottom of FIG. 5 shows a frame 550 for a second relay station (RS2).

For frame 510, the downlink subframe may be partitioned into a downlink access zone 512 and a downlink relay zone 516. The uplink subframe may be partitioned into an uplink access zone 522 and an uplink relay zone 526. The base station may transmit to subscriber stations in downlink access zone 512, transmit to the first relay station in downlink relay zone 516, receive from subscriber stations in uplink access zone 522, and receive from the first relay station in uplink relay zone 526.

For frame 530, the downlink subframe may be partitioned into a downlink access zone 532 and downlink relay zones 534 and 536. The uplink subframe may be partitioned into an uplink access zone 542 and uplink relay zones 544 and 546. The first relay station may receive from the base station in downlink relay zone 536, transmit to subscriber stations in downlink access zone 532, and transmit to the second relay station in downlink relay zone 534. The first relay station may receive from subscriber stations in uplink access zone 542, receive from the second relay station in uplink relay zone 544, and transmit to the base station in uplink relay zone 546.

For frame 550, the downlink subframe may be partitioned into a downlink access zone 552 and downlink relay zones 554 and 556. The uplink subframe may be partitioned into an uplink access zone 562 and uplink relay zones 564 and 566. The second relay station may receive from the first relay station in downlink relay zone 554 and transmit to subscriber stations in downlink access zone 552 and downlink relay zone 556. The second relay station may receive from subscriber stations in uplink access zone 562 and uplink relay zone 566 and transmit to the first relay station in uplink relay zone 564. Relay zones 556 and 566 may also be omitted.

FIGS. 3 and 4 show two frame structures that support two hops via one relay station. FIG. 5 shows a frame structure that supports three hops via two relay stations. For the frame structures in FIGS. 4 and 5, there is a delay of one frame for the data retransmitted by each relay station. Other frame structures may also be used for multihop relay. In general, a frame may include any number of zones for base station-subscriber station (BS-SS) communication, relay station-relay station (RS-RS) communication, and relay station-subscriber station (RS-SS) communication.

In an aspect, the system may support distributed scheduling and/or centralized scheduling for data transmission on the downlink with multihop relay. In one design, both distributed and centralized scheduling may be used for the non-transparent mode, and only centralized scheduling is used for the transparent mode. Table 2 lists some characteristics of distributed and centralized scheduling.

TABLE 2

| Scheduling | Description |
| --- | --- |
| Distributed scheduling | Base station transmits data to relay station based on CQI received from the relay station. Relay station retransmits the data to subscriber station based on CQI received from the subscriber station. |
| Centralized scheduling | Base station receives CQI from relay station and CQI from subscriber station and schedules transmission on both BS-RS link and RS-SS link. Relay station retransmits data to subscriber station based on scheduling decision from the base station for the RS-SS link. |

Figure 6:
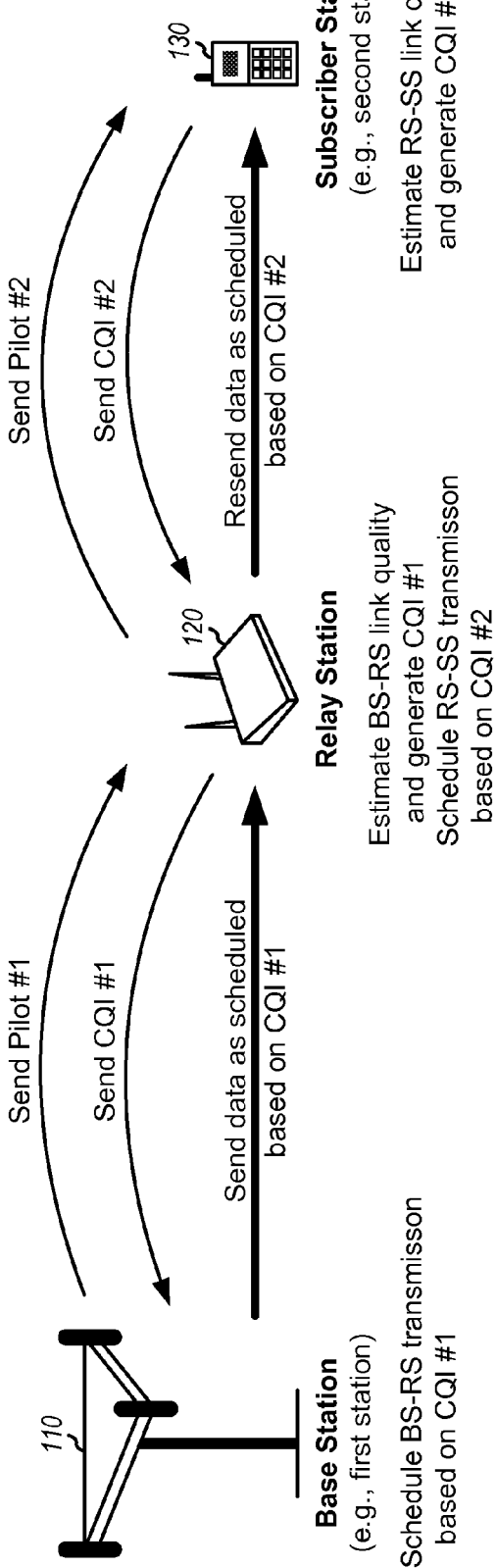
FIG. 6 shows a scheme for distributed scheduling in 2-hop relay.

FIG. 6 shows a scheme for transmitting data with distributed scheduling for 2-hop relay. The first hop is from base station 110 to relay station 120, and the second hop is from relay station 120 to subscriber station 130.

For the first hop, base station 110 may transmit pilot to relay station 120. Relay station 120 may estimate the quality of the BS-RS link based on the pilot from base station 110, generate CQI indicative of the BS-RS link quality (which is denoted as CQI #1), and send CQI #1 to base station 110. CQI may be provided in the form of a carrier-to-interference-and-noise ratio (CINR) report or some other format. Base station 110 may schedule BS-RS transmission for relay station 120 based on CQI #1. For example, base station 110 may allocate radio resources to relay station 120 and/or select a modulation and coding scheme for the BS-RS transmission based on CQI #1. Base station 110 may send data for subscriber station 130 to relay station 120 as scheduled based on CQI #1.

For the second hop, relay station 120 may transmit pilot to subscriber station 130. Subscriber station 130 may estimate the quality of the RS-SS link based on the pilot from relay station 120, generate CQI indicative of the RS-SS link quality (which is denoted as CQI #2), and send CQI #2 to relay station 120. Relay station 120 may schedule RS-SS transmission for subscriber station 130 based on CQI #2 and may resend the data received from base station 110 to subscriber station 130 as scheduled based on CQI #2.

Relay station 120 may periodically send CQI #1 on a CQI channel (CQICH) to base station 110, and subscriber station 130 may periodically send CQI #2 on another CQICH to relay station 120. Base station 110 may allocate the CQICH for relay station 120, and relay station 120 may allocate the CQICH for subscriber station 130. The CQICH allocation for each link may be provided via (i) a FAST-FEEDBACK Allocation IE that indicates a region used for CQI, which may be partitioned into slots, and (ii) a CQICH Allocation IE that indicates which slot is allocated to each station as well as how often and/or when each station should send CQI.

Figure 7:
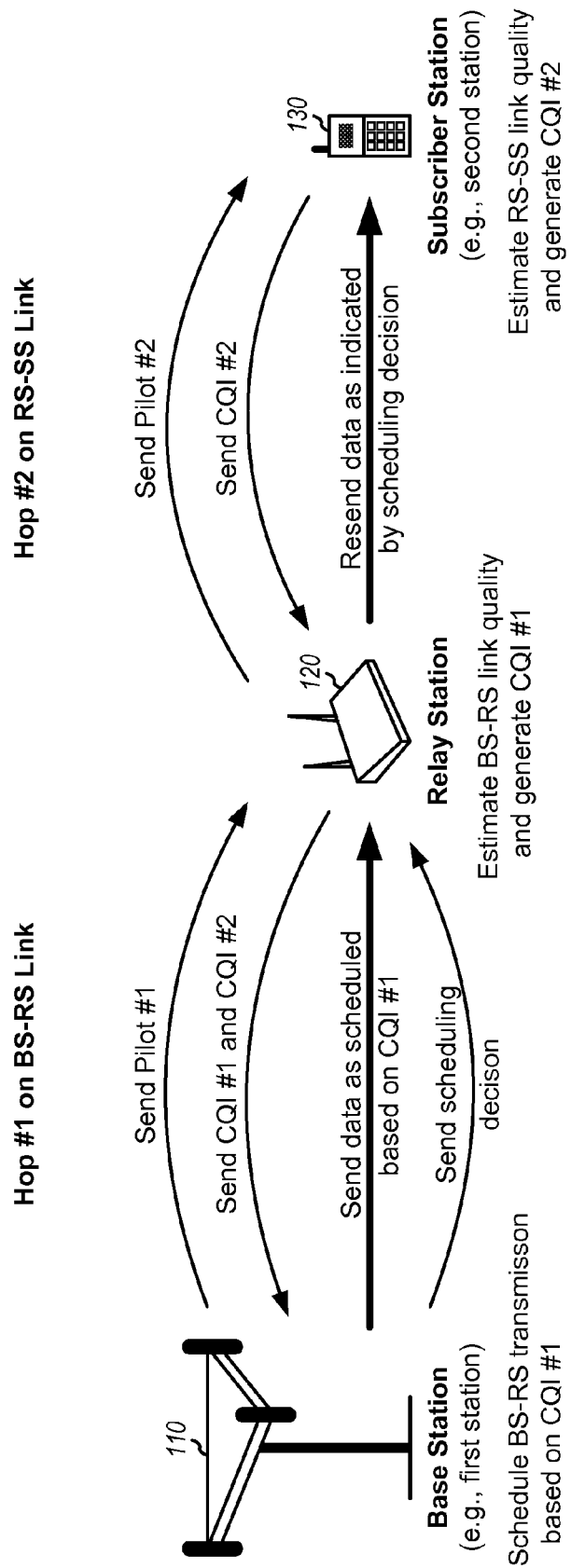
FIG. 7 shows a scheme for centralized scheduling in 2-hop relay.

FIG. 7 shows a scheme for transmitting data with centralized scheduling for 2-hop relay. Base station 110 may transmit pilot to relay station 120, and relay station 120 may transmit pilot to subscriber station 130. Relay station 120 may estimate the quality of the BS-RS link based on the pilot from base station 110 and generate CQI #1 indicative of the BS-RS link quality. Similarly, subscriber station 130 may estimate the quality of the RS-SS link based on the pilot from relay station 120, generate CQI #2 indicative of the RS-SS link quality, and send CQI #2 to relay station 120. Relay station 120 may send CQI #1 generated by the relay station as well as CQI #2 received from subscriber station 130 to base station 110.

Base station 110 may schedule BS-RS transmission for relay station 120 based on CQI #1 and may also schedule RS-SS transmission for subscriber station 130 based on CQI #2. Base station 110 may send data for subscriber station 130 to relay station 120 as scheduled based on CQI #1. Base station 110 may also send a scheduling decision for the RS-SS transmission to relay station 120. Relay station 120 may receive the data and scheduling decision from base station 110 and may resend the data to subscriber station 130 as indicated by the scheduling decision.

FIGS. 6 and 7 show distributed and centralized scheduling, respectively, for 2-hop relay. Distributed and centralized scheduling for more than two hops may be performed in similar manner.

For N-hop distributed scheduling, where N may be any integer value, a relay station may receive pilot from the next upstream station, which may be a base station or another relay station. The relay station may generate CQI for the next upstream station based on the received pilot and may send the CQI to this upstream station. The relay station may receive data sent by the next upstream station based on the CQI sent by the relay station. The relay station may also send pilot to the next downstream station, which may be a subscriber station or another relay station. The relay station may receive CQI generated by the next downstream station based on the pilot from the relay station. The relay station may resend the data received from the next upstream station to the next downstream station based on the CQI received from this downstream station.

For N-hop centralized scheduling, a relay station may receive CQI from each downstream station. The relay station may also generate CQI for the next upstream station. The relay station may send the CQI generated for the next upstream station as well as CQIs from all downstream stations to the next upstream station. The relay station may receive data sent by the next upstream station based on the CQI generated by the relay station. The relay station may also receive (i) a scheduling decision for the relay station, which may be generated by a base station based on the CQI from the next downstream station, and (ii) scheduling decisions for other downstream relay stations, if any, which may be generated by the base station based on the CQIs from their downstream stations. The relay station may resend the data to the next downstream station based on the scheduling decision for the relay station. The relay station may also send the scheduling decisions for other downstream relay stations, if any, to the next downstream station.

FIG. 8 shows a design of a process 800 performed by a relay station for distributed scheduling in multihop relay, which may correspond to FIG. 6. The relay station may receive a first transmission from a first station, which may be a base station or another relay station (block 812). The first transmission may comprise pilot, control information, etc. The relay station may estimate link quality for the first station based on the first transmission (block 814), generate first CQI based on the estimated link quality for the first station (block 816), and send the first CQI to the first station (block 818). The relay station may also send a second transmission to a second station, which may be a subscriber station or another relay station (block 820). The second transmission may comprise pilot, control information, etc. The relay station may receive second CQI generated by the second station based on the second transmission (block 822). The relay station may receive data sent by the first station based on the first CQI (block 824) and may resend the data to the second station based on the second CQI (block 826).

The first station may schedule data transmission from the first station to the relay station based on the first CQI. The relay station may schedule data transmission from the relay station to the second station based on the second CQI. The scheduling by each station may include assigning radio resources for data transmission, selecting a modulation and coding scheme for the data transmission, etc.

FIG. 9 shows a design of an apparatus 900 for supporting distributed scheduling in multihop relay. Apparatus 900 includes a module 912 to receive a first transmission (e.g., pilot) from a first station, a module 914 to estimate link quality for the first station based on the first transmission, a module 916 to generate first CQI based on the estimated link quality for the first station, a module 918 to send the first CQI to the first station, a module 920 to send a second transmission (e.g., pilot) to a second station, a module 922 to receive second CQI generated by the second station based on the second transmission, a module 924 to receive data sent by the first station based on the first CQI, and a module 926 to resend the data to the second station based on the second CQI.

Figures 10, 11:
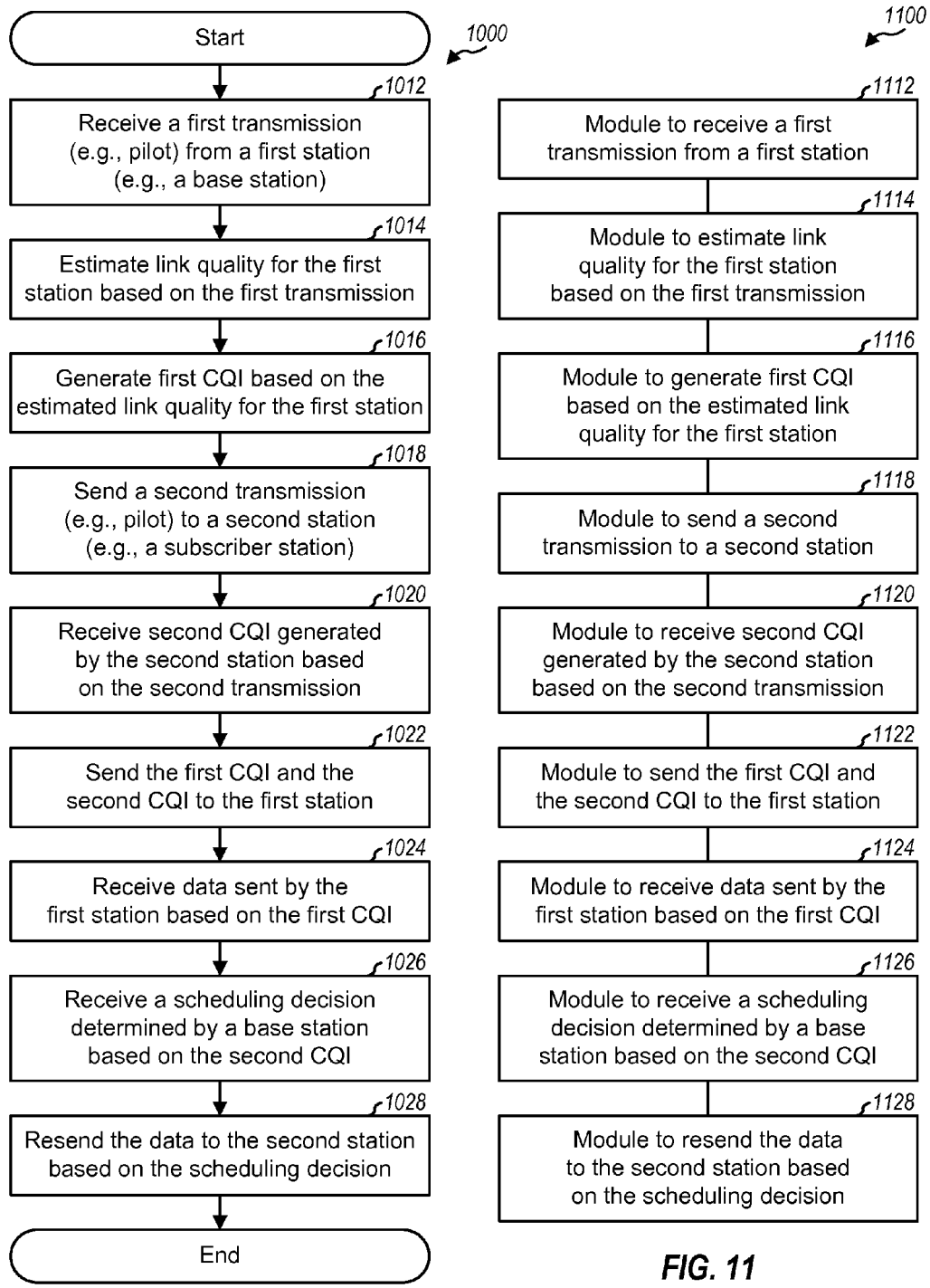
FIG. 10 shows a process for supporting centralized scheduling.
FIG. 11 shows an apparatus supporting centralized scheduling.

FIG. 10 shows a design of a process 1000 performed by a relay station for centralized scheduling in multihop relay, which may correspond to FIG. 7. The relay station may receive a first transmission from a first station, which may be a base station or another relay station (block 1012). The first transmission may comprise pilot, control information, etc. The relay station may estimate link quality for the first station based on the first transmission (block 1014), and generate first CQI based on the estimated link quality for the first station (block 1016). The relay station may send a second transmission to a second station, which may be a subscriber station or another relay station (block 1018). The second transmission may comprise pilot, control information, etc. The relay station may receive second CQI generated by the second station based on the second transmission (block 1020).

The relay station may send the first CQI and the second CQI to the first station (block 1022). The relay station may send the second CQI on the CQICH with the first CQI, on another feedback channel, in a Medium Access Control (MAC) management message, or via some other means to the first station. The relay station may receive data sent by the first station based on the first CQI (block 1024). The relay station may also receive a scheduling decision determined by a base station based on the second CQI (block 1026). The scheduling decision may comprise radio resources (e.g., subchannels) assigned to the second station, a modulation and coding scheme selected for the second station, etc. The relay station may resend the data to the second station based on the scheduling decision (block 1028).

FIG. 11 shows a design of an apparatus 1100 for supporting centralized scheduling in multihop relay. Apparatus 1100 includes a module 1112 to receive a first transmission (e.g., pilot) from a first station, a module 1114 to estimate link quality for the first station based on the first transmission, a module 1116 to generate first CQI based on the estimated link quality for the first station, a module 1118 to send a second transmission (e.g., pilot) to a second station, a module 1120 to receive second CQI generated by the second station based on the second transmission, a module 1122 to send the first CQI and the second CQI to the first station, a module 1124 to receive data sent by the first station based on the first CQI, a module 1126 to receive a scheduling decision determined a the base station based on the second CQI, and a module 1128 to resend the data to the second station based on the scheduling decision.

The modules in FIGS. 9 and 11 may comprise processors, electronics devices, hardware devices, electronics components, logical circuits, memories, etc., or any combination thereof FIGS. 8 through 11 show processes and apparatuses for a relay station for distributed and centralized scheduling in multihop relay. Processes and apparatuses for a base station and processes and apparatuses for a subscriber station may be implemented in an analogous manner based on FIGS. 6 and 7 and the description above.

In another aspect, the system may support distributed power control and/or centralized power control for uplink transmission with multihop relay. Table 3 lists some characteristics of distributed and centralized power control.

TABLE 3

| Power control | Description |
| --- | --- |
| Distributed power control | Base station estimates BS-RS link quality and sends power adjustment to relay station. Relay station adjusts its transmit power based on the power adjustment from the base station. Relay station estimates RS-SS link quality and sends power adjustment to subscriber station. Subscriber station adjusts its transmit power based on the power adjustment from the relay station. |
| Centralized power control | Base station obtains BS-RS and RS-SS link qualities, generates first power adjustment for relay station, and generates second power adjustment for subscriber station. Relay station adjusts its transmit power based on the first power adjustment from the base station. Subscriber station adjusts its transmit power based on the second power adjustment from the base station. |

In general, the quality of a given link may be estimated based on any transmission received via that link. Since a relay station and a subscriber station may each transmit the CQICH periodically, an upstream station may use the CQICH to estimate the link quality for the transmitting station. The following description assumes the use of the CQICH to estimate link quality.

A station (e.g., a subscriber station or a relay station) may transmit data and/or control information (e.g., CQI) to an upstream station. The transmit power for data and the transmit power for control information may have a predetermined relationship, e.g., a fixed offset. The station may adjust its transmit power for both data and control information based on power adjustments received from the upstream station. For example, the transmit power may be (i) adjusted by an amount indicated by a power adjustment, (ii) either increased or decreased by a predetermined amount as indicated by the power adjustment, or (iii) adjusted in some other manner based on the power adjustment. A power adjustment may also be referred to as a power adjust, a power control (PC) command, a transmit power control (TPC) command, etc.

Figure 12:
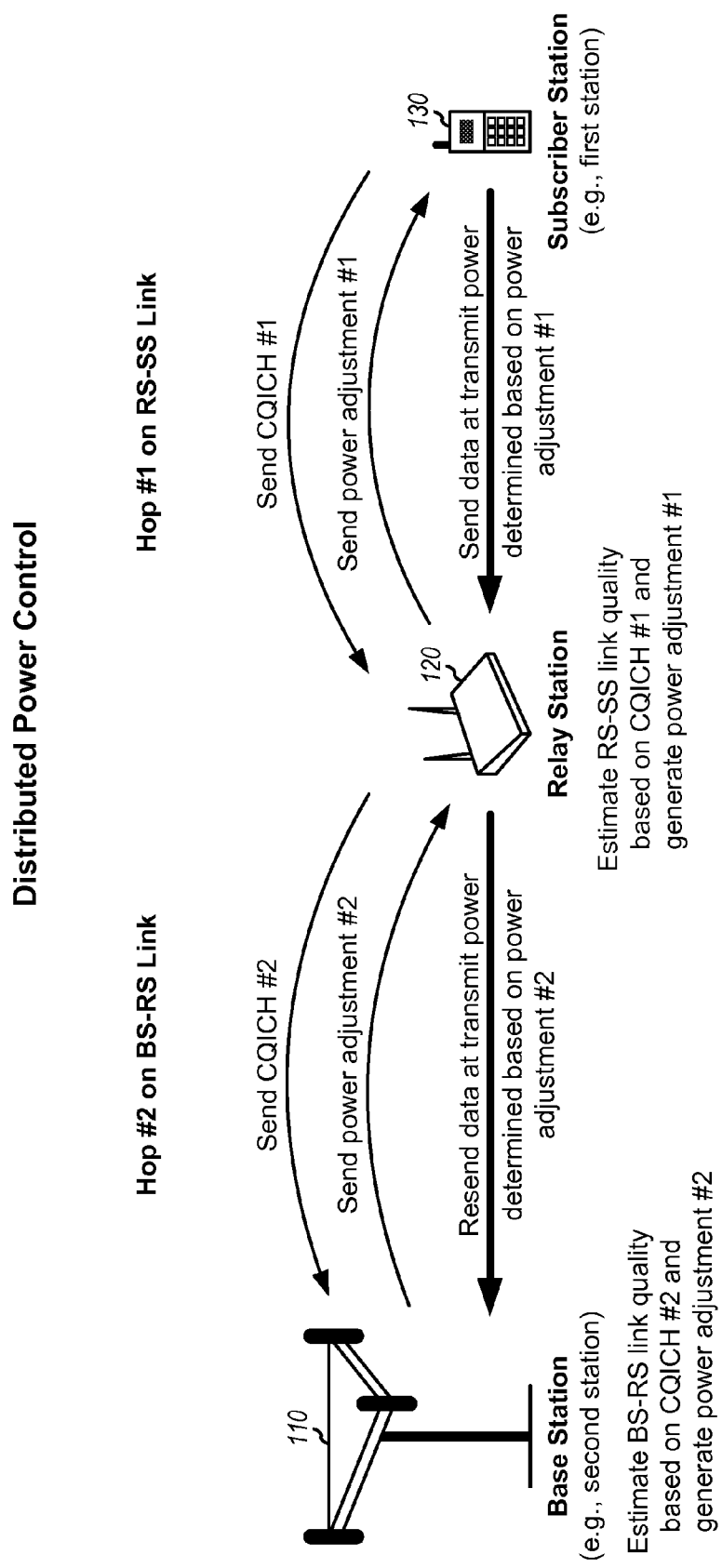
FIG. 12 shows a scheme for distributed power control in 2-hop relay.

FIG. 12 shows a scheme for distributed power control for 2-hop relay. The first hop is from subscriber station 130 to relay station 120, and the second hop is from relay station 120 to base station 110.

For the first hop, subscriber station 130 may transmit a first CQICH (which is denoted as CQICH #1) to relay station 120. Relay station 120 may estimate the RS-SS link quality based on CQICH #1, generate a first power adjustment (which is denoted as power adjustment #1) based on the estimated RS-SS link quality, and send power adjustment #1 to subscriber station 130. Subscriber station 130 may send data to relay station 120 at transmit power determined based on power adjustment #1.

For the second hop, relay station 120 may transmit a second CQICH (which is denoted as CQICH #2) to base station 110. Base station 110 may estimate the BS-RS link quality based on CQICH #2, generate a second power adjustment (which is denoted as power adjustment #2) based on the estimated BS-RS link quality, and send power adjustment #2 to relay station 120. Relay station 120 may resend the data received from subscriber station 130 to base station 110 at transmit power determined based on power adjustment #2.

Figure 13:
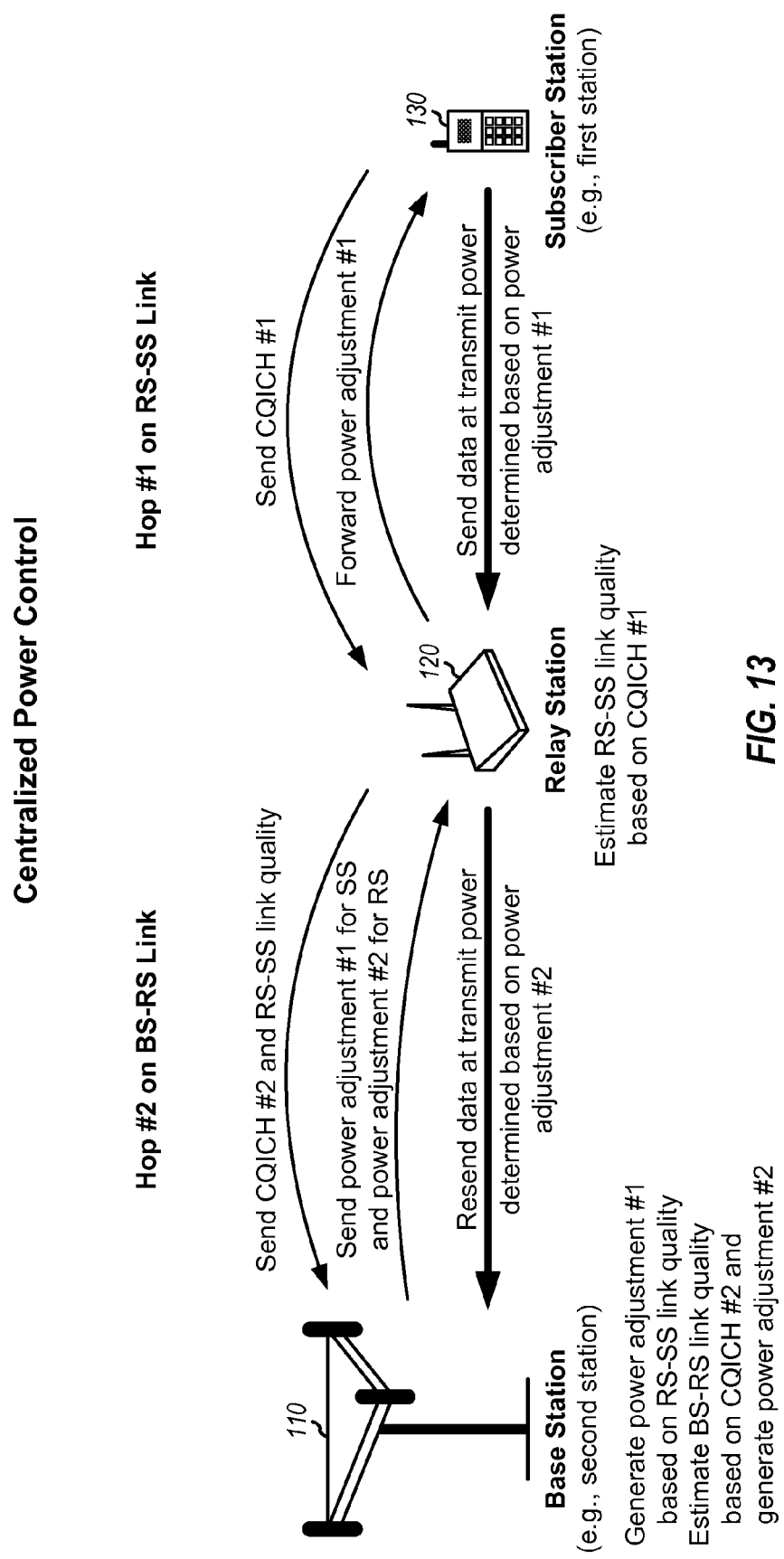
FIG. 13 shows a scheme for centralized power control in 2-hop relay.

FIG. 13 shows a scheme for centralized power control for 2-hop relay. Subscriber station 130 may transmit CQICH #1 to relay station 120, and relay station 120 may estimate the RS-SS link quality based on CQICH #1. Relay station 120 may send CQICH #2 and the estimated RS-SS link quality to base station 110. Base station 110 may generate power adjustment #1 based on the estimated RS-SS link quality. Base station 110 may also estimate the BS-RS link quality based on CQICH #2 and generate power adjustment #2 based on the estimated BS-RS link quality. Base station 110 may send power adjustments #1 and #2 to relay station 120, which may forward power adjustment #1 to subscriber station 130. Subscriber station 130 may send data to relay station 120 at transmit power determined based on power adjustment #1. Relay station 120 may resend the data to base station 110 at transmit power determined based on power adjustment #2.

FIGS. 12 and 13 show distributed and centralized power control, respectively, for 2-hop relay. Distributed and centralized power control for more than two hops may be performed in similar manner.

For N-hop distributed power control, a relay station may receive a transmission from the next downstream station, which may be a subscriber station or another relay station. The relay station may estimate the link quality for the next downstream station based on the received transmission, generate a power adjustment based on the estimated link quality, and send the power adjustment to the next downstream station. The relay station may receive data sent by the next downstream station at transmit power determined based on the power adjustment from the relay station. The relay station may also send a transmission to the next upstream station, which may be a base station or another relay station. The relay station may receive a power adjustment generated by the next upstream station based on link quality for the relay station, which may be estimated based on the transmission from the relay station. The relay station may resend the data received from the next downstream station to the next upstream station at transmit power determined based on the power adjustment from the next upstream station.

For N-hop centralized power control, a relay station may receive a transmission from the next downstream station as well as estimated link qualities for all further downstream stations, if any. The relay station may estimate the link quality for the next downstream station based on the transmission from this downstream station. The relay station may send a transmission as well as estimated link qualities for all downstream stations to the next upstream station. The relay station may receive a power adjustment determined by a base station based on link quality for the relay station, which may be estimated based on the transmission from the relay station. The relay station may also receive power adjustments for all downstream stations, which may be generated by the base station based on the estimated link qualities for these downstream stations. The relay station may forward these power adjustments to the next downstream station. The relay station may receive data sent by the next downstream station at transmit power determined based on the power adjustment for this downstream station. The relay station may resend the data to the next upstream station at transmit power determined based on the power adjustment for the relay station.

Figures 14, 15:
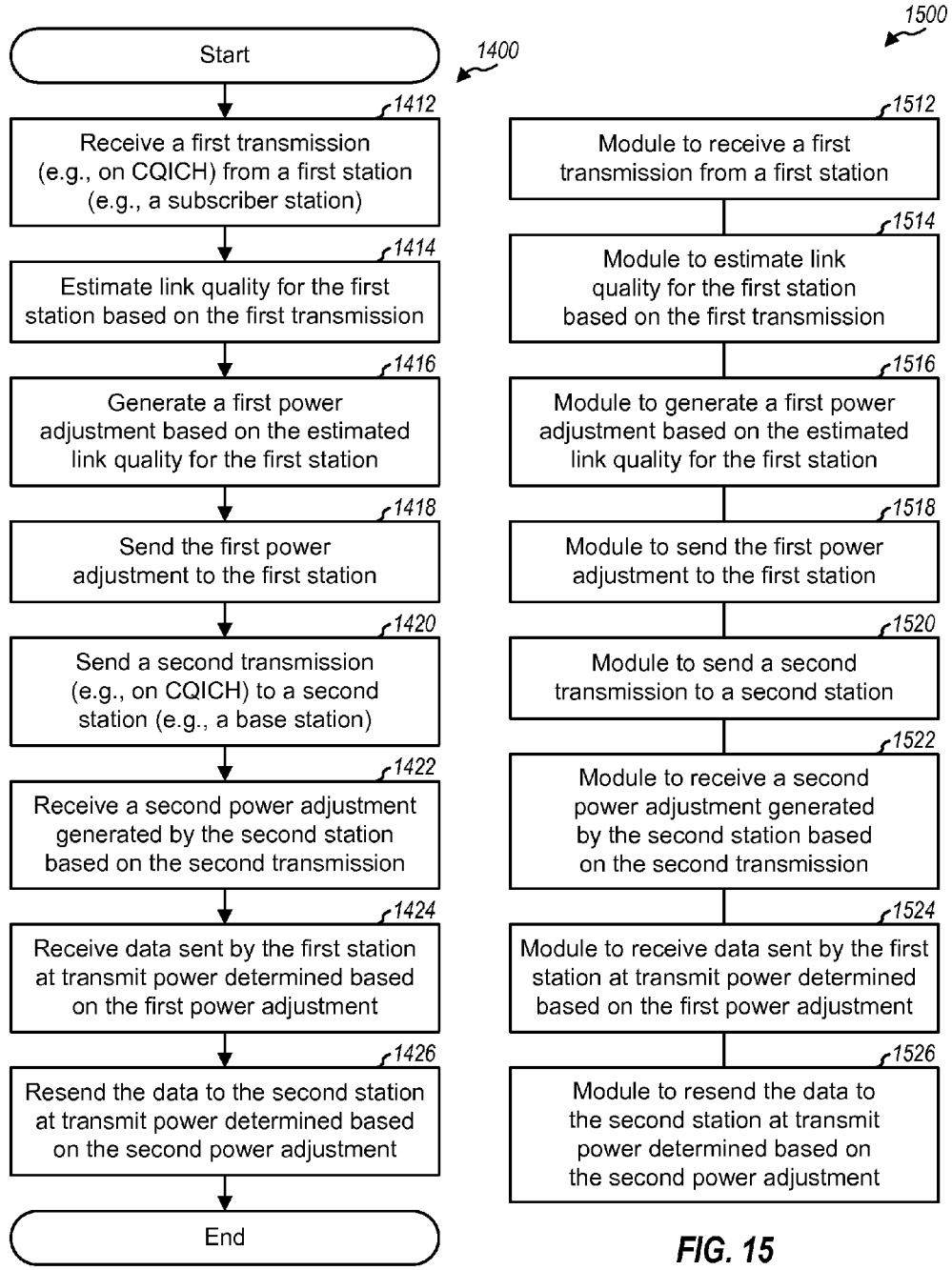
FIG. 14 shows a process for supporting distributed power control.
FIG. 15 shows an apparatus supporting distributed power control.

FIG. 14 shows a design of a process 1400 performed by a relay station for distributed power control in multihop relay, which may correspond to FIG. 12. The relay station may receive a first transmission from a first station, which may be a subscriber station or another relay station (block 1412). The first transmission may comprise CQI sent on a CQICH, pilot, etc. The relay station may estimate link quality for the first station based on the first transmission (block 1414), generate a first power adjustment based on the estimated link quality for the first station (block 1416), and send the first power adjustment to the first station (block 1418).

The relay station may send a second transmission to a second station, which may be a base station or another relay station (block 1420). The second transmission may comprise CQI sent on a CQICH, pilot, etc. The relay station may receive a second power adjustment generated by the second station based on the second transmission (block 1422). The relay station may receive data sent by the first station at transmit power determined based on the first power adjustment (block 1424). The relay station may resend the data to the second station at transmit power determined based on the second power adjustment (block 1426).

FIG. 15 shows a design of an apparatus 1500 for supporting distributed power control in multihop relay. Apparatus 1500 includes a module 1512 to receive a first transmission from a first station, a module 1514 to estimate link quality for the first station based on the first transmission, a module 1516 to generate a first power adjustment based on the estimated link quality for the first station, a module 1518 to send the first power adjustment to the first station, a module 1520 to send a second transmission to a second station, a module 1522 to receive a second power adjustment generated by the second station based on the second transmission, a module 1524 to receive data sent by the first station at transmit power determined based on the first power adjustment, and a module 1526 to resend the data to the second station at transmit power determined based on the second power adjustment.

Figures 16, 17:
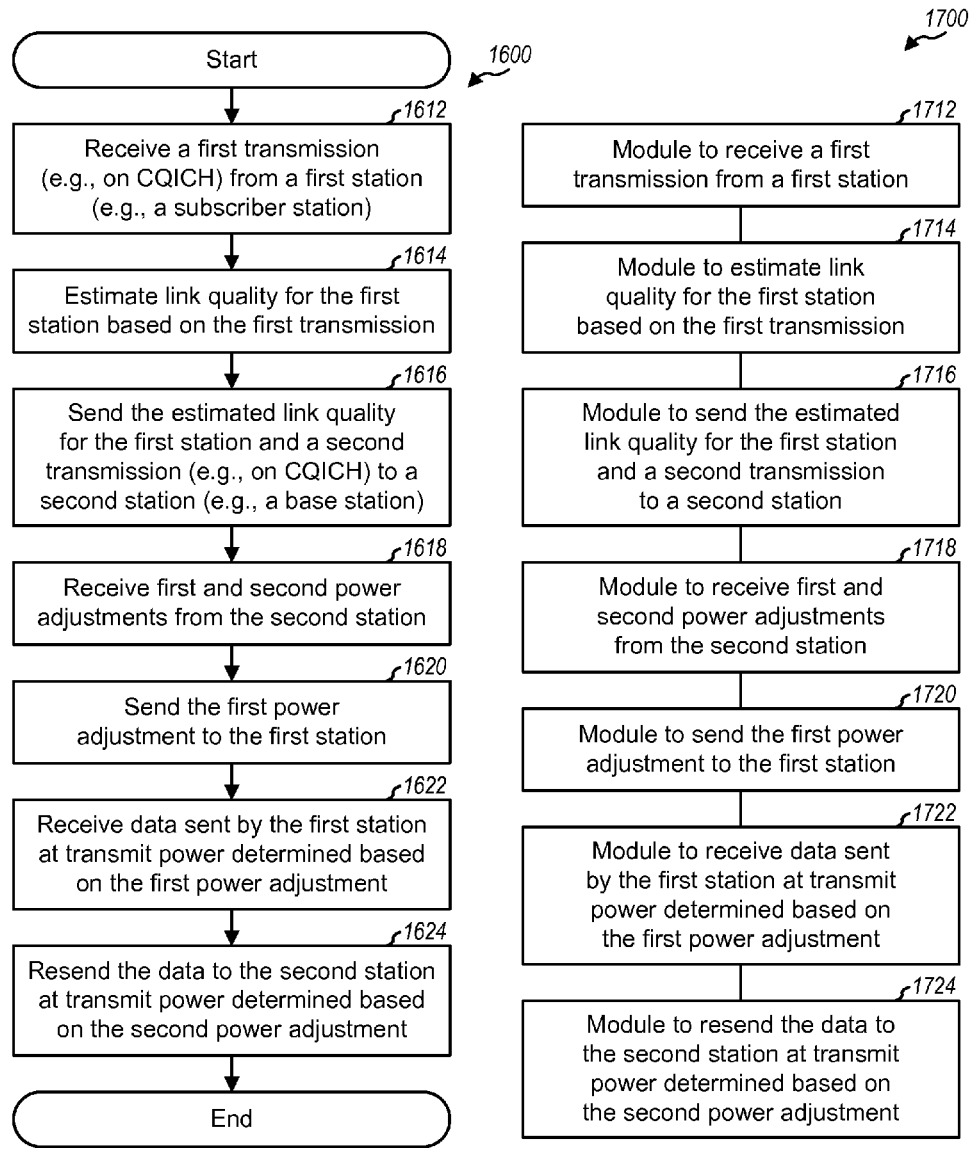
FIG. 16 shows a process for supporting centralized power control.
FIG. 17 shows an apparatus supporting centralized power control.

FIG. 16 shows a design of a process 1600 performed by a relay station for centralized power control in multihop relay, which may correspond to FIG. 13. The relay station may receive a first transmission from a first station, which may be a subscriber station or another relay station (block 1612). The first transmission may comprise CQI sent on a CQICH, pilot, etc. The relay station may estimate link quality for the first station based on the first transmission (block 1614). The relay station may send the estimated link quality for the first station and a second transmission to a second station, which may be a base station or another relay station (block 1616). The second transmission may comprise CQI sent on a CQICH, pilot, etc. The relay station may send the estimated link quality for the first station on the CQICH, on a feedback channel, in a MAC management message, or via some other means to the second station.

The relay station may receive first and second power adjustments from the second station, with the first power adjustment being generated based on the estimated link quality for the first station, and the second power adjustment being generated based on the second transmission (block 1618). The relay station may send the first power adjustment to the first station (block 1620). The relay station may receive data sent by the first station at transmit power determined based on the first power adjustment (block 1622). The relay station may resend the data to the second station at transmit power determined based on the second power adjustment (block 1624).

FIG. 17 shows a design of an apparatus 1700 for supporting centralized power control in multihop relay. Apparatus 1700 includes a module 1712 to receive a first transmission from a first station, a module 1714 to estimate link quality for the first station based on the first transmission, a module 1716 to send the estimated link quality for the first station and a second transmission to a second station, a module 1718 to receive first and second power adjustments from the second station, a module 1720 to send the first power adjustment to the first station, a module 1722 to receive data sent by the first station at transmit power determined based on the first power adjustment, and a module 1724 to resend the data to the second station at transmit power determined based on the second power adjustment.

The modules in FIGS. 15 and 17 may comprise processors, electronics devices, hardware devices, electronics components, logical circuits, memories, etc., or any combination thereof FIGS. 14 through 17 show processes and apparatuses for a relay station for distributed and centralized power control in multihop relay. Processes and apparatuses for a base station and processes and apparatuses for a subscriber station may be implemented in an analogous manner based on FIGS. 12 and 13 and the description above.

FIG. 18 shows a block diagram of a design of base station 110, relay station 120, and subscriber station 130 in FIG. 1. At base station 110, a transmit processor 1810 receives data for subscriber station 130 and other subscriber stations, processes (e.g., encodes, interleaves, and modulates) the data, and generates data symbols. Transmit processor 1810 also processes overhead information (e.g., MAP messages, power adjustments, scheduling decisions, etc.) to obtain overhead symbols and processes pilot to obtain pilot symbols. Transmit processor 1810 further processes the data, overhead, and pilot symbols (e.g., for OFDM) and generates output chips. A transmitter (TMTR) 1812 conditions (e.g., converts to analog, amplifies, filters, and frequency upconverts) the output chips and generates a downlink signal, which is transmitted via an antenna 1814.

At relay station 120, an antenna 1834 receives the downlink signal from base station 110 and provides a received signal to a receiver (RCVR) 1836. Receiver 1836 conditions (e.g., filters, amplifies, frequency downconverts, and digitizes) the received signal and provides samples. A receive processor 1838 processes the samples (e.g., for OFDM) to obtain received symbols, processes received pilot symbols to obtain a channel estimate, and performs detection on received data and overhead symbols with the channel estimate to obtain detected symbols. Receive processor 1838 further processes (e.g., demodulates, deinterleaves, and decodes) the detected symbols to recover the data and overhead information sent by base station 110. A transmit processor 1830 processes the data received from base station 110, overhead information, and pilot to generate data, overhead, and pilot symbols, respectively. Transmit processor 1830 further processes these symbols (e.g., for OFDM) to generate output chips. A transmitter 1832 conditions the output chips and generates a downlink relay signal, which is transmitted via antenna 1834.

At subscriber station 130, the downlink relay signal from relay station 120 is received by an antenna 1850, conditioned by a receiver 1852, and processed by a receive processor 1854 to recover the data resent by relay station 120. The downlink signal from base station 110 is also received by antenna 1850, conditioned by receiver 1852, and processed by receive processor 1854 to recover overhead information sent by base station 110 in the transparent mode. Data, signaling (e.g., CQI), and pilot to send on the uplink are processed by a transmit processor 1856 and conditioned by a transmitter 1858 to generate an uplink signal, which is transmitted via antenna 1850.

Relay station 120 receives and processes the uplink signal from subscriber station 130 to recover the data and signaling sent by the subscriber station. Relay station 120 processes the data, signaling, and pilot to generate an uplink relay signal, which is transmitted to base station 110. At base station 110, the uplink relay signal is received by antenna 1814, conditioned by a receiver 1816, and processed by a receive processor 1818 to recover the data and signaling sent by relay station 120.

Controllers/processors 1820, 1840 and 1860 direct the operation of various units at base station 110, relay station 120, and subscriber station 130, respectively. Controller/processor 1840 may perform or direct process 800 in FIG. 8, process 1000 in FIG. 10, process 1400 in FIG. 14, process 1600 in FIG. 16 and/or other processes for the techniques described herein. Memories 1822, 1842 and 1862 store data and program codes for base station 110, relay station 120, and subscriber station 130, respectively.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 1822, 1842 or 1862 in FIG. 18) and executed by a processor (e.g., processor 1820, 1840 or 1860). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   a processor; and
   a memory in electronic communication with the processor, the memory embodying instructions, the instructions being executable by the processor to:
      estimate link quality based on a transmission received from a first station;
      generate first channel quality information (CQI) based on the estimated link quality;
      send the first CQI to the first station;
      receive second CQI from a second station, the second CQI being different from the first CQI;
      receive data sent by the first station according to a first transmission schedule determined by the first station, the first transmission schedule comprising an allocation of radio resources;
      identify a second transmission schedule for transmissions to the second station, the second transmission schedule comprising an allocation of radio resources to the second station; and
      send the data to the second station using the allocated radio resources based on the second transmission schedule.

2. The apparatus of claim 1, wherein the instructions are executable by the processor to:
   receive a pilot from the first station;
   estimate link quality for the first station based on the pilot; and
   generate the first CQI based on the estimated link quality for the first station.

3. The apparatus of claim 1, wherein the instructions are executable by the processor to:
   send a pilot to the second station; and
   receive the second CQI generated by the second station based on the pilot.

4. The apparatus of claim 1, wherein the first station schedules transmission of the data from the first station according to the first transmission schedule.

5. The apparatus of claim 4, wherein the at least one processor is configured to perform at least one of assigning radio resources to the second station and selecting a modulation and coding scheme for the second station to schedule transmission of the data to the second station.

6. The apparatus of claim 1, wherein the instructions are executable by the processor to:
   schedule transmission of the data to the second station according to the second transmission schedule.

7. The apparatus of claim 1, wherein the first station is a base station and the second station is a subscriber station.

8. The apparatus of claim 1, wherein the instructions to identify the second transmission schedule comprising an allocation of the radio resources to the second station are executable by the processor to:
   analyze the second CQI; and
   determine the second transmission schedule comprising the allocation of the radio resources for the second station.

9. The apparatus of claim 1, wherein the instructions to identify the second transmission schedule comprising an allocation of the radio resources to the second station are executable by the processor to:
   transmit the second CQI to the first station; and
   receive the second transmission schedule comprising the allocation of the radio resources for the second station from the first station.

10. A method for wireless communication, comprising:
- estimating link quality based on a transmission received from a first station;
- generating first channel quality information (CQI) based on the estimated link quality;
- sending the first CQI to the first station;
- receiving second CQI from a second station, the second CQI being different from the first CQI;
- receiving data sent by the first station according to a first transmission schedule determined by the first station, the first transmission schedule comprising an allocation of radio resources;
- identifying a second transmission schedule for transmissions to the second station, the second transmission schedule comprising an allocation of radio resources to the second station; and
- sending the data to the second station using the allocated radio resources based on the second transmission schedule.

11. The method of claim 9, further comprising:
- receiving a first pilot from the first station; and
- sending a second pilot to the second station, the first CQI being generated based on the first pilot and the second CQI being generated based on the second pilot.

12. The method of claim 9, further comprising:
- scheduling transmission of the data to the second station according to the second transmission schedule.

13. The method of claim 9, wherein identifying the second transmission schedule comprising an allocation of the radio resources to the second station comprises:
- analyzing the second CQI; and
- determining the second transmission schedule comprising the allocation of the radio resources for the second station.

14. The method of claim 9, wherein identifying the second transmission schedule comprising an allocation of the radio resources to the second station comprises:
- transmitting the second CQI to the first station; and
- receiving the second transmission schedule comprising the allocation of the radio resources for the second station from the first station.

15. An apparatus for wireless communication, comprising:
- means for estimating link quality based on a transmission received from a first station;
- means for generating first channel quality information (CQI) based on the estimated link quality;
- means for sending the first CQI to the first station;
- means for receiving second CQI from a second station, the second CQI being different from the first CQI;
- means for receiving data sent by the first station according to a first transmission schedule determined by the first station, the first transmission schedule comprising an allocation of radio resources;
- means for identifying a second transmission schedule for transmissions to the second station, the second transmission schedule comprising an allocation of radio resources to the second station; and
- means for sending the data to the second station using the allocated radio resources based on the second transmission schedule.

16. The apparatus of claim 15, further comprising:
- means for receiving a first pilot from the first station; and
- means for sending a second pilot to the second station, the first CQI being generated based on the first pilot and the second CQI being generated based on the second pilot.

17. The apparatus of claim 15, further comprising:
- means for scheduling transmission of the data to the second station according to the second transmission schedule.

18. A computer program product comprising a non-transitory computer-readable storage medium storing instructions executable by a processor to:
- estimate link quality based on a transmission received from a first station;
- generate first channel quality information (CQI) based on the estimated link quality;
- send the first CQI to the first station;
- receive second CQI from a second station, the second CQI being different from the first CQI;
- receive data sent by the first station according to a first transmission schedule determined by the first station, the first transmission schedule comprising an allocation of radio resources;
- identify a second transmission schedule for transmissions to the second station, the second transmission schedule comprising an allocation of radio resources to the second station; and
- send the data to the second station using the allocated radio resources based on the second transmission.

19. The computer program product of claim 18, wherein the instructions are executable by the processor to:
- schedule transmission of the data to the second station according to the second transmission schedule.

20. An apparatus for wireless communication, comprising:
- a processor;
- a memory in electronic communication with the processor; and
- instructions stored in the memory, the instructions being executable by the processor to:
  - send a pilot to a relay station;
  - receive first channel quality information (CQI) generated by the relay station based on the pilot;
  - generate a first transmission schedule comprising an allocation of radio resources to the relay station; and
  - send data to the relay station using the allocated radio resources, the data being sent by the relay station to a subscriber station according to a second transmission schedule comprising an allocation of radio resources to the subscriber station.

21. An apparatus for wireless communication, comprising:
- a processor;
- a memory in electronic communication with the processor; and
- instructions stored in the memory, the instructions being executable by the processor to:
  - generate the first channel quality information (CQI) for a first station;
  - receive second CQI from a second station, the second CQI being different from the first CQI;
  - send the first CQI and the second CQI to the first station;
  - receive data sent by the first station according to a first transmission schedule determined by the first station, the first transmission schedule comprising an allocation of radio resources;
  - receive a second transmission schedule from and determined by the first station, the second transmission schedule identifying a radio resource to allocate to the second station; and
  - send the data to the second station based on the second transmission schedule.

22. The apparatus of claim 21, wherein the instructions are executable by the processor to:
 receive pilot from the first station;
 estimate link quality for the first station based on the pilot; and
 generate the first CQI based on the estimated link quality for the first station.

23. The apparatus of claim 21, wherein the instructions are executable by the processor to:
 send pilot to the second station; and
 receive the second CQI generated by the second station based on the pilot.

24. The apparatus of claim 21, wherein the first station schedules transmission of the data from the first station according to the first transmission schedule, and generates the second transmission schedule.

25. The apparatus of claim 21, wherein the second transmission schedule comprises at least one of radio resources assigned to the second station and a modulation and coding scheme selected for the second station.

26. The apparatus of claim 21, wherein the first station is a base station and the second station is a subscriber station.

27. A method for wireless communication, comprising:
 generating first channel quality information (CQI) for a first station;
 receiving second CQI from a second station, the second CQI being different from the first CQI;
 sending the first CQI and the second CQI to the first station;
 receiving data sent by the first station according to a first transmission schedule determined by the first station, the first transmission schedule comprising an allocation of radio resources;
 receiving a second transmission schedule from and determined by the first station, the second transmission schedule identifying a radio resource to allocate to the second station; and
 sending the data to the second station based on the second transmission schedule.

28. The method of claim 27, further comprising:
 receiving a first pilot from the first station; and
 sending a second pilot to the second station, the first CQI being generated based on the first pilot, and the second CQI being generated based on the second pilot.

29. The method of claim 27, wherein transmission of the data from the first station is scheduled by a base station according to the first transmission schedule, and the second transmission schedule is generated by the base station.

30. An apparatus for wireless communication, comprising:
 a processor;
 a memory in electronic communication with the processor; and
 instructions stored in the memory, the instructions being executable by the processor to:
  send a pilot to a relay station;
  receive first channel quality information (CQI) and second CQI from the relay station, the first CQI being generated based on the pilot, and the second CQI being sent by a subscriber station to the relay station, the second CQI being different from the first CQI;
  determine a transmission schedule, the transmission schedule comprising an allocation of radio resources to allocate to the subscriber station;
  send data to the relay station; and
  send the transmission schedule to the relay station, the data being sent by the relay station to the subscriber station based on the transmission schedule.

* * * * *